United States Patent [19]
Kimura et al.

[11] 3,947,737
[45] Mar. 30, 1976

[54] GATE CONTROL OF THYRISTOR CONVERTERS FOR REVERSIBLY DRIVING A D.C. ELECTRIC MOTOR

[75] Inventors: Takashi Kimura, Fuchu; Toshiyuki Ogita, Tokyo; Takahiro Sumihana, Fussa, all of Japan

[73] Assignee: Tokyo Shibaura Electric Co., Ltd., Tokyo, Japan

[22] Filed: May 30, 1974

[21] Appl. No.: 474,699

[30] Foreign Application Priority Data
May 30, 1973 Japan.............................. 48-60709

[52] U.S. Cl................ 318/257; 318/314; 318/327; 318/331
[51] Int. Cl.²......................................... H02P 5/16
[58] Field of Search .......... 318/257, 317, 314, 327, 318/331, 345

[56] References Cited
UNITED STATES PATENTS

| | | | |
|---|---|---|---|
| 3,612,974 | 10/1971 | Wolf................................... | 318/314 |
| 3,617,844 | 11/1971 | Grygera............................. | 318/327 |
| 3,713,012 | 1/1973 | Johnson........................... | 318/257 X |
| 3,764,885 | 10/1973 | Buxbaum........................ | 318/257 X |
| 3,795,850 | 3/1974 | Grygera........................... | 318/257 X |

*Primary Examiner*—B. Dobeck
*Attorney, Agent, or Firm*—Oblon, Fisher, Spivak, McClelland & Maier

[57] ABSTRACT

A gate control for thyristor converters connected in opposition to reversibly drive a D.C. electric motor in which one of the thyristor converters operates as a rectifier and the other remains still when the motor runs forward, and vice versa. The gate control includes an operational amplifier to carry out current control for the converters and to generate an output therefrom which follows the motor armature voltage during the switchover between converters to prepare for reverse rotation of the motor. The other converter, which operates momentarily as an inverter to feed electric energy from the motor back to an A.C. electric voltage supply thereof to reduce the motor speed, is controlled to enable its inverter voltage to coincide substantially with the motor armature voltage so as not to cause excessive rushing current from the motor into the inverter at the instant of the switchover.

7 Claims, 18 Drawing Figures

GATE CONTROL OF THYRISTOR CONVERTERS FOR REVERSIBLY DRIVING A D.C. ELECTRIC MOTOR

BACKGROUND OF THE INVENTION

1. Field of the Invention

This invention relates to an improved static Ward Leonard system in which two sets of thyristor converters are connected in opposition to reversibly energize a D.C. electric motor.

2. Description of the Prior Art

A static Ward Leonard system has heretofore been employed to energize a D.C. electric motor for driving a blooming mill or a thick plate rolling mill which is driven both reversibly and frequently. There are two well known types of static Ward Leonard system, one is directed to a current circulation type and other to a non-current circulation type.

The former current circulation type includes two sets of thyristor converters connected in opposition so that a D.C. electric motor is driven by being energized from the one of the thyristor converters which operates as a rectifier to apply its output D.C. voltage to the motor while the other thyristor converter momentarily operates as an inverter for supplying a regenerative brake to the motor to prepare for reverse rotation of the motor. When a signal for reverse rotation of the motor is applied to a gate control which is provided commonly to both thyristor converters to control gate electrodes thereof, the former converter which has been operating as a rectifier is controlled by the gate control immediately to reduce its D.C. output current and finally to come to a halt. In this event, since the latter converter is retained as an inverter, electric energy from the motor is fed back immediately to an A.C. voltage supply of the latter therethrough to apply the regenerative brake to the motor. The motor is thus controlled to rapidly reduce its speed. After finishing that, the latter converter is transferred from inverter to rectifier, so that the motor is energized therefrom to start reverse rotation.

Although this system was satisfactory in that it has been capable of making the reversible running of the motor smooth, it was unsatisfactory in that one of the two thyristors is retained as an inverter during the time the motor is rotating by being energized from the other thyristor. As a result, there has unsatisfactorily occurred a cross-current flowing from the rectifier to the inverter accompanied by an undesired loss of electric power.

There was, therefore, a need to provide reactors in the anti-parallel connection circuit of converters to prevent or to reduce the cross-current effectively. However, the installation of such reactors has forced the static Ward Leonard system not only to be expensive but also to be large in size.

Because of the above, the aforesaid static Ward Leonard system of noncurrent circulation type has been developed. The system of this type provides two sets of thyristor converters connected in opposition without reactors for the prevention of any cross-current between rectifier and inverter.

In this case, one of the converters is used as a rectifier to apply a D.C. voltage therefrom to the motor to forwardly rotate it while the other converter remains still. As soon as a switchover order signal is applied to a gate control of the system, the gate control forces the electric control angle of lag of the former rectifier to be larger so that the rectifier output current is brought to zero immediately. After that, the other converter starts to operate momentarily as an inverter to absorb electric energy generated from the motor so that the motor speed is effectively reduced under a regenerative effect. As soon as the motor speed has reached zero, the other converter is transferred from inverter to rectifier to energize the motor therefrom to rotate it in reverse.

As described above, in accordance with this system, it is readily understood that the system can be manufactured not only to be inexpensive, but also to be smaller in size because of the lack of reactors for reducing cross-current.

However, in this system, it is very difficult to overcome the rushing current which runs from the motor into the converter that has just become an inverter. This results from the fact that the amplitude of inverter voltage does not coincide with that of the motor armature voltage so that the latter is considerably higher than the former when the switchover has been made between converters.

In accordance with the invention, the rushing current has been reduced by having the amplitude of the inverter voltage controlled by the gate control so as to be as equal as possible to the amplitude of the rectifier voltage at the instant of switchover between converters.

This has been achieved by a gate control which includes a memory device therein to memorize a motor speed controlling signal just before beginning switchover between two converters so that the gate control angle of lead for the converter which has just become the inverter is determined by the memorized controlling signal.

Although this has been somewhat satisfactory, the amplitude of rushing current flowing from motor to inverter has remained undesireably high in spite of the use of a gate control.

This was caused by a specific gate control angle of lead of the inverter just after the switchover. Although this will be described in detail hereinafter, an outline of this will be described here. If the gate control angle of lead of the inverter has been selected so as to be small enough to cause discontinuance of the inverter current when the switch over has just been carried out between converters, the inverter voltage will become insufficient in its amplitude as compared with that of the rectifier voltage of the motor armature before switchover. The rushing current will thus flow from the motor into the converter operating as an inverter which may destroy the thyristor elements therein.

SUMMARY OF THE INVENTION

It is therefore an object of the invention to provide a new, unique and improved static Ward Leonard system which consists of two sets of thyristor converters connected in opposition to reversibly energize a D.C. electric motor without the above defects.

Another object of the invention is to provide such a static Ward Leonard system capable of effectively reducing the amplitude of rushing current which runs into a converter that forms one component of the system and which functions as an inverter just after switchover from the other component which has functioned as a rectifier.

It is a further object of the invention to provide a static Ward Leonard system which consists of two sets of thyristor converters and includes a gate control which generates gate control signals to one of the converters which momentarily functions as an inverter following the motor armature voltage during the switchover from one state to another.

A still further object of the invention is to provide a static Ward Leonard system for reversibly energizing a D.C. electric motor which consists of two sets of thyristor converters connected in opposition without reactors for reducing cross current therebetween, and which is able to make the switchover between converters smoothly by minimizing the rushing current flowing from the motor to one of the converters which momentarily operates as an inverter during switchover.

Briefly, in accordance with one aspect of the invention in a gate control for two sets of thyristor converters connected in opposition for reversibly driving a D.C. electric motor in which one of said thyristor converters operates as a rectifier for energizing said motor to drive it forward and the other remains still when said motor runs forward, said gate control comprises means for generating gating pulses synchronized with frequencies of an A.C. voltage supply for said converters, a pair of gating circuits for applying the gating pulses from said gating pulse generating means to gate electrodes of said converters selectively, means for comparing the rotational speed signal from said motor with a speed reference voltage signal and for feeding the speed deviation voltage signal to said pulse generating means to phase shift the gating signals for enabling adjustment of output voltage from the one of said converters operating as a rectifier to thereby adjust the motor speed to coincide substantially with the reference speed indicated by said speed reference voltage signal, an operational amplifier having an integrating function and effecting current control of said converters by the deviation signal when converter current is compared with said deviation derived from said speed deviation feeding means for enabling the converter current to be substantially equal to the speed deviation, and means for cutting said operational amplifier off from said speed deviation feeding means and alternatively applying an electrical signal responsive to the motor speed and an output feedback signal of said operational amplifier to an input terminal of the operational amplifier during switchover from one state to another between said two sets of thyristor converters to prepare for reverse rotation of said motor whereby the phase control for said gating signals emanating from said gate control is controlled following said electrical signal responsive to the motor speed during the switchover between the thyristor converters.

BRIEF DESCRIPTION OF THE DRAWINGS

A more complete appreciation of the invention will be readily obtained as the same becomes better understood by reference to the following detailed description when considered in connection with the accompanying drawings, in which:

FIGS. 3a to 3i show wave forms for illustration of the logic circuit disclosed in FIG. 2;

DETAILED DESCRIPTION OF THE PREFERRED EMBODIMENTS

Figure 1A:
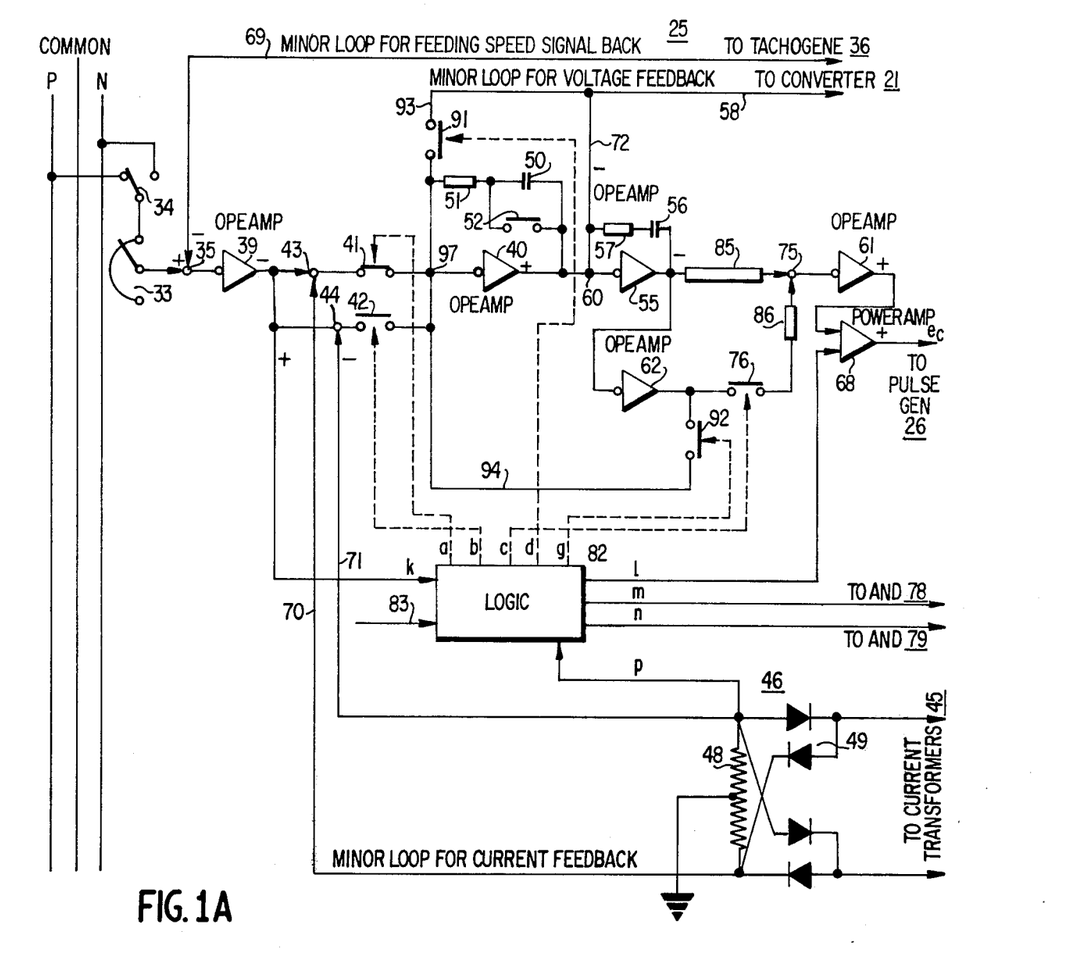
FIGS. 1a and 1b are blocked connection diagrams of one embodiment of a gate control of thyristor converters for reversibly driving a D.C. electric motor in accordance with the invention.
Figure 1B:
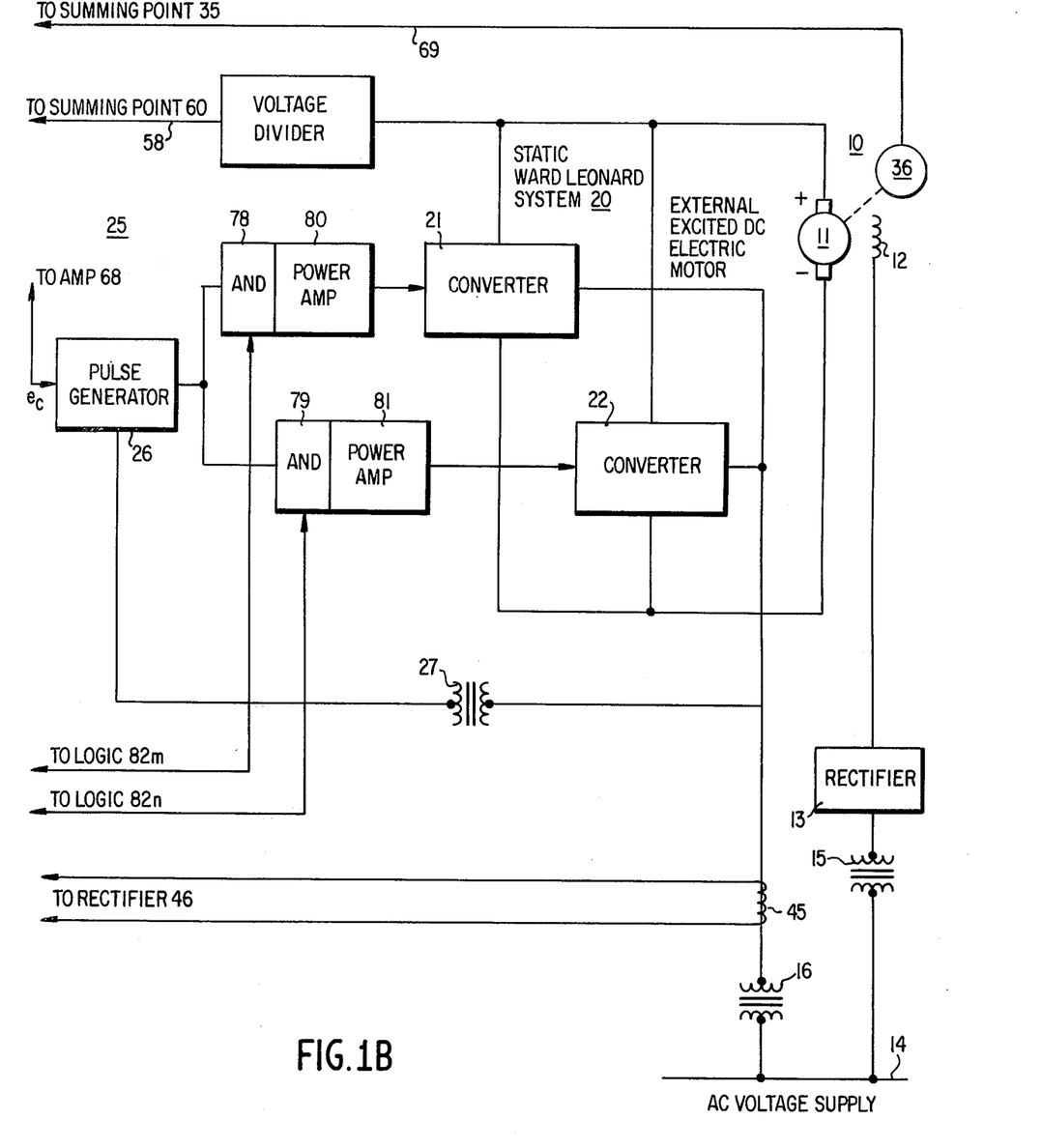

Referring now to the drawings and particularly to FIGS. 1a and 1b thereof, there is shown a D.C. electric motor 10 with an armature 11 and an external excitation field winding 12. The electric motor is a motor which is suited for driving a blooming mill or a thick plate rolling mill, both reversibly and frequently. (not shown)

The external excitation field 12 is excited by a constant D.C. excitation current which is fed from an excitation rectifier 13 having either a three-phase or a single phase input connected to a three-phase voltage supply 14 of commercial frequency through a power transformer 15.

A static Ward Leonard system is shown by a reference numeral 20 in general and the same consists of two sets of thyristor converters 21 and 22 each having a three-phase or a single phase full wave bridge connected thyristors (not shown). Both A.C. inputs 21 and 22 are connected to a A.C. voltage supply 14 through a transformer 16 while the D.C. outputs of the same are connected in opposition for reversibly energizing motor armature 11. Thus, if converter 21 operates as a rectifier while converter 22 remains still, the motor armature 11 will be able to rotate forwardly. On the other hand, when alternative converter 22 operates as a rectifier while converter 21 remains still, motor armature 11 will be able to rotate in reverse.

As described hereinbelow, when it is intended to effect reverse rotation of motor 10, converter 21 will be controlled to terminate the rectifying operation thereof, while alternative converter 22 will be controlled to operate momentarily as an inverter for reducing the motor speed. After the motor speed has reached approximately zero, converter 22 will be forced to function as a rectifier to rotate the motor 10 in reverse.

In order to effect the above control, there is provided a gate control designated by a reference numeral 25 in general, which includes a gating pulse generator 25 which is energized from A.C. voltage supply 14 through an auxiliary transformer 27 and which is controlled by an electric signal as described below.

The circuit shown in FIG. 3 represents a connection which applies gating pulses to a thyristor connected only in phase R of three-phase lines R, S and T of A.C. voltage supply 14. The circuit has a transistor 30 connected between a positive terminal P and a common terminal, namely zero volts, of an auxiliary D.C. constant voltage supply (described below) through a resistor $R_1$.

For effecting the phase shift control, an interphase voltage $e_{S-R}$ is applied to the base electrode of transistor 30 through a resistor $R_2$ while a D.C. voltage $e_C$ is also applied to the same through a resistor $R_3$.

As will be understood clearly from above, the instance at which interphase voltage $e_{S-R}$ becomes positive, namely at the point of zero voltage level, can be varied in accordance with amplitude of the D.C. control voltage $e_C$ so that the voltage level at the collector electrode of transistor 30 can fall suddenly to zero every time by being controlled by control voltage $e_C$ to cause a negative going pulse 32. Accordingly, it has become clear that gating signals obtained by shaping the negative going pulses which are applied to gate electrodes in thyristor elements mounted in converters 21 and 22 can be varied in their phases in accordance with their anode voltages in accordance with the amplitude variation of D.C. control signal $e_C$.

Returning again to FIGS. 1a and 1b, particularly to FIG. 1a, there is provided auxiliary D.C. voltage supply lines which are illustrated by positive, negative and common P, N and "COMMON", for obtaining the speed reference voltage signals. The speed reference voltage signal can be obtained in accordance with a predetermined polarity and a desired amplitude from a potentiometer 33 connected to lines P, N and COMMON through a single-pole-double-throw switch 34 as shown.

For the convenience of illustration, the control signal polarities are shown in FIGS. 1a and 1b with respect to the forward running of motor 10. Switch 34 is closed leftward to obtain the speed reference of forward running from the potentiometer 33 so that a positive signal is applied to a summing point 35. On the other hand, a speed signal responsive to actual motor speed is also introduced to summing point 35 from a D.C. tachometer generator 35 which is directly coupled with the motor shaft.

The actual motor speed signal has a negative polarity during the forward rotation of armature 11. In this event, converter 21 operates as a rectifier for energizing the armature 11 with a current having a polarity for effecting forward running while the converter 22 remains still. It will accordingly be understood that the gating pulses generated from pulse generator 26 are conducted to converter 21 for causing rectifier operation thereof.

Since a D.C. motor which drives a reversible rolling mill generally has its capacities of the order of several thousand KW, its moment of inertia is large enough to almost effect the acceleration during the forward or reverse running of the motor.

Accordingly, the speed reference signal from potentiometer 33 will normally overcome the actual motor speed signal or speed feed back signal coming from tachometer generator 35 so that the deviation therebetween will have a positive polarity during the forward rotation of motor 10.

The speed deviation is coupled to an operational amplifier 39 to be operated therein to generate a signal with a negative polarity which is coupled to the pulse generator 26 to phase shift the output pulses thereof.

The polarities of signals on input and output terminals of operational amplifiers 39 have been illustrated above. The polarity of the input signal for pulse generator 25 should be positive whether converter 21 or converter 22 is in operation. The polarities on input and output terminals of operation amplifiers which will be described below are shown only by positive and negative symbols instead of by detailed illustrations.

The speed deviation signal from operational amplifier 39 which is for speed control for motor 10 is conducted to a second operational amplifier 40 through either one of contacts 41 and 42. The contacts 41 and 42 have both been shown by a symbol of mechanical contact for convenience of illustration. However, they may be transistorized static switches which are switched by the operational order of the system. The details of switching them is not included herein as it is not necessary for an understanding of the operation of the present invention.

The contact 41 closes when converter 21 is in operation while the contact 42 alternatively closes when converter 22 is in operation. The speed deviation signal from operational amplifier 39 is conducted through contact 31 to the second operational amplifier 40.

A summing point 43 is positioned between amplifier 39 and contact 41 in order to provide a current feedback signal with a positive polarity responsive to an A.C. current in the main A.C. circuit of converters 21 and 22 during the time converter 21 is in operation. Similarly another summing point 44 is provided between amplifier 39 and contact 42 so as to provide another current feedback signal with a negative polarity responsive to an A.C. current in the main A.C. circuit of converters 21 and 22 during the time converter 22 is in operation.

The current feedback signal can be obtained from a current transformer 45 and is treated in a current detector as generally shown by reference numeral 46. The current detector 45 comprises a full wave rectifying unit 47 with four diode elements having their electrodes connected to opposite terminals of a secondary winding of current transformer 45 and a resistor 48 with a center tap connected to the aforesaid COMMON line. One of the terminals of resistor 48 provides a positive current signal which is conducted to summing point 43. The other terminal provides a negative current signal which is in turn connected to summing point 44 and a zero current signal P on which will be described below.

The operational amplifier 40 is of the conventional integrator type with a circuit connected in parallel therewith and having an integrating capacitor 50 and a feedback resistor 51 connected in series with capacitor 50. A contact 52 is provided in parallel with capacitor 50 for resetting the integrator during the time converters 21 and 22 are both still.

The output from amplifier 40 is then introduced to a third operational amplifier 55 which is also of the type of integrator with a parallel circuit having an integrating capacitor 56 and a negative feedback resistor 57. The third amplifier 55 acts as a voltage controlling amplifier, the input of which is connected to a main D.C. circuit of converters 21 and 22 through conductor 58 serially included in a conventional D.C. voltage divider 59 with excellent characteristics of electric insulation.

The feedback voltage signal derived from the D.C. circuit of converters 21 and 22 is applied to a summing point 60 together with the output from operational amplifier 40 so that the D.C. voltage deviation signal is coupled from the amplifier 55 to a fourth operational amplifier 61 so as to be conducted successively to a power amplifier 68 for amplifying the D.C. control signal.

From the above, it is apparent that the pulse generator 26 is controlled by the output of power amplifier 68 to generate the gating pulses which shift their phase in accordance with the amplitude of the D.C. control signal. The gating pulses are applied to the gate electrodes of the thyristor converter 21, during the forward running of the motor 10.

The pulse generator 26 generates the gate controlling signals in accordance with the resultant D.C. control signal caused by three minor feedback loops 69, 70 and 72, namely, speed, current and voltage loops. The converter 21 generates the D.C. voltage to enable the motor 10 to rotate forward with a properly controlled speed under the control provided by the resultant D.C. control signal.

The polarities of inputs and outputs on operational amplifiers have the symbols illustrated with respect to the forward rotation of motor 10. In the event of reverse rotation of motor 10, it is to be understood that the polarities of inputs and outputs of the operational amplifiers are reversed.

This is caused by the reverse or rightward throwing of the switch 34 so that the reference speed voltage will change its polarity. Also, as the motor 10 is reverse rotated, the polarity of the actual speed feedback signal which is fed back from the tachometer generator 36 will be reversed. Further, the selection of reverse rotation of the motor 10 will force the contact 41 to open and the contact 42 to close so that the second minor loop 70 will be altered by loop 71 to feed a negative current signal back from current detector 46 to the summing point 44 to be compared with the output of operational amplifier 39 which has been reversed.

In the above, if the polarity reversal of the output of operational amplifier 61 occurs, the input polarity of pulse generator 26 will be undesirably reversed. However, this is effectively avoided by providing a further operational amplifier 62 which operates between operational amplifiers 55 and 61 and acts as the polarity change amplifier during the reverse rotation of motor 10.

The input terminal of amplifier 62 is connected to the output of amplifier 55 and the output terminal amplifier 62 is connected to a summing point 75 provided between amplifiers 55 and 61 through a contact 76 which is of the transistorized static switch type and closes only during the reverse running of motor 10. The gain of the circuit including amplifier 62 is selected to be twice that of the circuit which includes amplifier 55 only. Accordingly, even if the output polarity of amplifier 55 has been in reverse upon the reverse rotation of motor 10, the polarity of the resultant output obtained from summing point 75 generates a positive output from operational amplifier 61.

The system of the present invention is provided with an exchanger device for feeding the gating pulses from pulse generator 26 selectively to either converter 21 or converter 22 whichever is in operation. The exchanger comprises two gating circuits 78 and 79, each having one input connected to the output of pulse generator 26. The gates 78 and 79 have another input terminal to which a gating signal is applied to open the gate. Absence of a gating signal causes the gate to close. The gates 78 and 79 may be of the AND type.

When converter 21 is in operation and converter 22 is still, AND gate 78 opens and AND gate 79 closes to feed the gating signals or pulses from pulse generator 26 only to converter 21 through a pulse amplifier 80. Similarly, when converter 21 is altered by converter 22, the gate 78 closes and gate 79 opens to feed the gating pulses from pulse generator 26 only to converter 22 through a pulse amplifier 81.

To cause the converters 80 and 81 to change from one to another, there is provided a logic circuit generally shown by a reference numeral 82. The logic circuit 82 has two inputs, one of which is connected to a negative terminal of current detector 46 to receive a signal P to detect zero current in the A.C. circuit for converters 21 and 22 and the other of which is connected to the output of the operational amplifier 39 to receive a state changing signal $k$ of the motor 10 which responds to the motor operation from forward rotation to reverse and vice versa.

From the above, it can be understood that the logic circuit 82 detects both the running state signal $k$ for the motor 10 and the signal P in response to the stoppage of the converters 21 and 22 and that the logical operation is carried out therein as described hereinbelow to change the state of output signals $a$, $b$, $c$, $l$, $m$ and $n$ sequentially.

The detailed description for the state change of output signals of logic circuit 82 will be made hereinafter by referring to FIG. 2 and FIGS. 3a to 3h. However, there is illustrated the result of one change of state of outputs from the logic 82 in order to understand the organic combination among the elements disclosed in FIG. 1 and the respective functions thereof.

The logic circuit 82 has a further input 83 which receives an operation command signal from a master control board (not shown) for causing the logic circuit 82 to be placed into operation.

When the motor 10 is in its forward running position as stated above, the output signals $a$ and $m$ are in the state "1" and signals $b$, $c$, $l$ and $n$ are in the alternate state "0". If the switch 34 is thrown rightward to cause the reverse running of the motor 10, the signal $k$ changes the state from 1 to 0. However, any state change does not occur in the output signals of the logic circuit 82 at this time.

The speed reference signal voltage from potentiometer 33 reverses its polarity causing the generation of a speed feedback signal voltage through minor loop 60 to cause the phase of the gating pulses generated from pulse generator 26 to lag and to reduce the D.C. output voltage of the converter 21.

As a result, the motor current for forward running will reduce until zero current is reached sometime thereafter. When the motor current has reached zero, the signal P coming from current detector 46 will correspond to zero current to change its state from 0 to 1. At this time, the logic 82 changes the signal $l$ from 0 to 1, and the signal $a$ changes from 1 to 0. The state change of signal $a$ opens contact 41 and the 1 of signal $l$ is added to power amplifier 68 to override the control signal from the pre-stage amplifier 61. Accordingly, the D.C. control voltage $e_c$ from amplifier 68 will remain constant to fix the phase control angle of lag of gating pulses from pulse generator 25 at a maximum, i.e., an electric angle of 90° for a three-phase full wave thyristor bridge rectifier.

It is additionally noted that the signals $b$ and $c$ remain 0 along with the signal $a$. The logic circuit 82 also generates the signals $d$ and $g$ which change from 0 to 1 to close contacts 91 and 92 under the condition of simultaneous 0 of all the signals $a$, $b$ and $c$. The contact 91 is provided for sub-minor loop 93 and the contact 92 is provided for a further sub-reference loop 94.

The sub-minor loop 93 feeds the D.C. output voltage of converter 21 back to a summing point 97 while the sub-reference loop 94 feeds the output signal of the operational amplifier 62 back to the same point 97 so that the operational amplifier 40 which has been operating as a current controlling amplifier 40 which has been operating as a current controlling amplifier has had to input the deviation voltage signal responsive to the difference between the rectifier output voltage or motor armature voltage and the voltage control output from operational amplifier 62.

Even though the motor feeding current becomes zero, the motor 10 still runs forward. The motor armature 11 therefore generates a voltage with its polarity as shown.

The operational amplifier 40 is of an integration type and has an input terminal with a summing point 97 at which the voltage feed back signal from the output terminals of converter 22 or the motor armature terminals is confronted with the output of the operational amplifier 62 from sub-feed back loop 94.

It is to be understood that the output from operational amplifier 62 is influenced substantially by the output of the operational amplifier 40. The output of operational amplifier 62 which in turn is coupled to summing point 97 is similar to that of operational amplifier 40 and acts as a reference signal to the motor armature voltage from sub-minor loop 93.

In other words, the operational amplifier 40 generates an output signal voltage in accordance with the motor armature voltage which varies from hour to hour.

The output signal voltage of operational amplifier 40 is applied as a voltage reference to operational amplifier 55 which functions as a voltage amplifier as described above. If desired however, the amplifier 55 can operate to merely amplify the input from pre-stage amplifier 40 by cutting the minor loop or line 72 by a contact (not shown) which opens during the changing of running direction of the motor 10.

Thus, the output of amplifier 55 is amplified through operational amplifier 62 to be fed back to the summing point 97 or input of operational amplifier 40 as a further feedback voltage signal. The output of amplifier 55, the amplitude of which is varied to follow the motor armature voltage, is applied to the input of operational amplifier 61 and to power amplifier 63 to control pulse generator 26.

The signal 1 from logic 81 overrides the above control signal from amplifier 55 at the input of power amplifier 68 so that pulse generator 26 controls the converter 21 as a rectifier which functions under a gate controlling angle of 90°. As a result, the output voltage of converter 21 is equal to 0.

Subsequently, the signal 1 from logic 82 changes from 1 to 0 so that the output from power amplifier 68 follows the control signal supplied by operational amplifiers 40 and 55.

At the same time, the signal $n$ changes its state from 0 to 1 so that the AND gate 79 is opened to conduct the gating signal from pulse generator 25 to power amplifier 81. Consequently, the converter 22 is enabled for operation.

It is however understood that the gate control angle remains a lag angle $\alpha$ of 90° for converter 21 when converter 21 is operable as a rectifier. This angle $\alpha$ of lag 90° also corresponds to a lead angle of 0° for converter 22 where the latter is operable as an inverter.

As is well known, if the converter 22 operates as an inverter at a lead angle $\gamma$ of 0°, the converter 22 generates the maximum A.C. voltage which in turn functions as a back emf against the motor induced voltage. Accordingly, the regenerative current cannot flow from the motor 10 through converter 22 to A.C. voltage supply 14 at the instant at which AND gate 79 is opened.

The operational amplifier 40 has a memory function by virtue of capacitor 50 connected in parallel therewith so that if the motor speed is high, the gate control signal voltage $e_c$ will have an amplitude sufficient to hold the gate angle $\gamma$ of lead of the converter 22 near 0°. In this way, effective regeneration will not occur to absorb the electric energy of the motor 10.

As the motor speed decreases under a mechanical load, the motor armature voltage decreases so that the output voltage of the operational amplifier decreases following the motor armature voltage. Thus, the gate control angle $\gamma$ of lead increases gradually. Subsequently, converter 22 begins to function as an inverter.

It can thus be understood that the variation of the gate angle of lead of the converter 22 can occur following the variation of motor armature voltage. Accordingly, when the converter is in operation as an inverter, the gate control angle $\gamma$ of lead will have amplitude which does not follow the current which flows from motor armature 11 into converter 22. Consequently, there can be no damage to the thyristor elements mounted in converter 22.

When the inverter current flows through converter 22, the zero current signal P changes from 1 to 0 so that the logic signals $b$ and $c$ change their states from 0 to 1 and the logic signals $d$ and $g$ also change from 1 to 0. In this way, the contacts 91 and 92 open and the contacts 42 and 76 close so that the gate control 25 is ready for effecting the reverse running of the motor 10. However, so long as the forward rotation of the motor 10 continues, the speed feedback signal voltage remains negative and is added to the speed reference voltage from potentiometer 33 so that a speed deviational signal with a large amplitude and positive polarity is obtained at the output terminal of amplifier 39.

The speed deviation signal functions as a current reference which is coupled to summing point 44 with the current signal from current detector 46 and has a negative polarity. Thus, the operational amplifier 40 amplifies and outputs the current deviational signal with a negative polarity. The current deviational signal obtained from amplifier 40 acts as a voltage reference and is applied to the summing point 50 to be coupled with the feedback voltage from voltage feedback loop 58 from the output terminals of converter 22.

The voltage deviation signal obtained from amplifier 55 has a negative polarity and is directed to summing points 75 through a path which includes resistor 85 and through another path which includes operational amplifier 62, closed contact 76 and resistor 86.

When the reverse direction or reverse rotation of the motor 10 is ordered by the potentiometer 33, the polarity symbols as shown from the potentiometer 33 to the output of operational amplifier 55 are reversed.

However, as there is an added path which includes operational amplifier 62, contact 76, resistor 86 and has a gain which is twice that of the path which includes operational amplifier 55 and resistor 25, if the input or output signal voltage level of the operational amplifier 55 is assumed to be constant, the output signal voltage level of operational amplifier 62 at the upper terminal of resistor 86 is twice that of the rightward terminal of resistor 85.

The polarity of the operational amplifier 62 is reversed so that the input voltage signal from the summing point 75 to the operational amplifier 67 is the same as that when the operational amplifier is not in the circuit. The polarity of the input signal for the operational amplifier 61 is reversed to that of the output signal of operational amplifier 55. Consequently, the power amplifier 68 derives pulse generator 26 to effect the gate control for converter 22.

For clearly understanding the operation of the system in accordance with the invention, it is important to understand the property of the prior static Ward Leonard System which includes two thyristor converters connected in reverse parallel.

Figure 5:
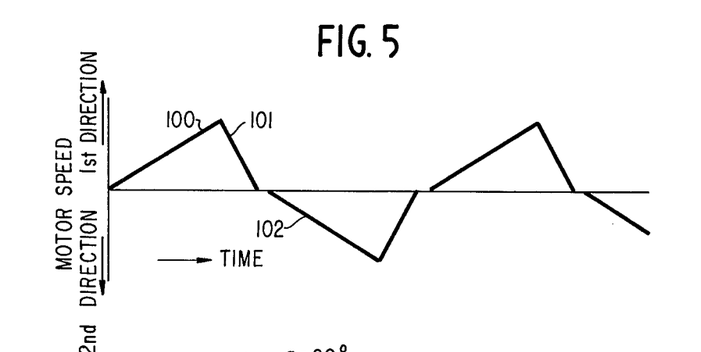
FIG. 5 shows a running mode of the electric motor which frequently effects the reversible rotation.

FIG. 5 shows the reversible running of the motor 10 for driving the reversible rolling mill. When the first direction, namely forward rotation, is selected for the motor 10, it will be accelerated along a curve 100 under the control of a converter which is a rectifier. If the motor speed becomes a speed at which the reverse rotation will be ordered, the converter gates will cut off the gate control signal to stop the rectifier operation of the converter. Another rectifier starts to be operated as an inverter, momentarily, so that the electric energy of the motor 10 is returned to A.C. voltage supply 14 through the inverter to brake the motor 10 by regenerative braking. Accordingly, the motor speed will be reduced along a curve 101 quickly and when the same has reached zero, the converter will change from inverter operation to operate as a rectifier to accelerate the motor 10 along a curve 102. In this way, reversible running of the motor 10 will be repeated as shown in curves of FIG. 5.

As is well known in the art, it is required that the motor which drives the rolling mill have the operational characteristic of quick response of its speed control. Accordingly, the motor is provided with an armature rotor with a relatively small diameter to reduce the moment of inertia thereof and is further provided with an armature winding having a relatively small inductance in order to achieve a quick response for the electric speed control system.

If the inductive component of the winding is small, the resistive component thereof will not be negligible so that the resistance of the armature winding will be large relative to the inductance thereof.

Figure 6A:
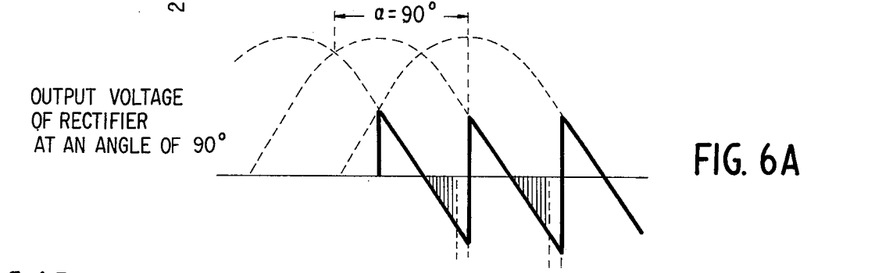
FIGS. 6a and 6b represent wave forms of a D.C. output voltage and current at a particular gate control angle of a three-phase full wave bridge connected to a thyristor converter.
Figure 6B:
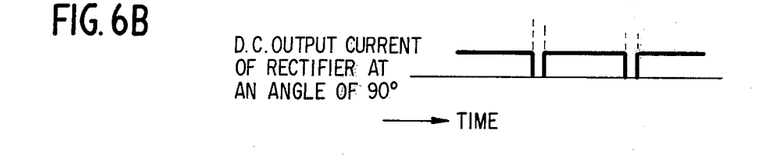

Referring to FIGS. 6a and b, there is shown the voltage wave forms during the rectifier operation of the three-phase full wave bridge connected converter in which the gate control angle is selected at an electrical angle of lag of 90°. With the lag angle of 90° the rectified voltage provides saw-tooth wave forms as shown above the zero line. If the load to the rectifier is completely inductive, negative parts of voltage equal to the positive parts will result.

In the event however that the resistive component is relatively high so that its effect cannot be neglected, the electric energy which is returned by the inductance becomes less than that above so that the negative parts will be reduced. As the result, the D.C. output current of the rectifier is likely to be cut off as shown in FIG. 6b at times corresponding to the space of FIG. 6a. This means that a positive D.C. output voltage appears across the output terminals of the rectifier even though the gate control angle of lag is fixed to the electric angle of 90°.

Figure 7:
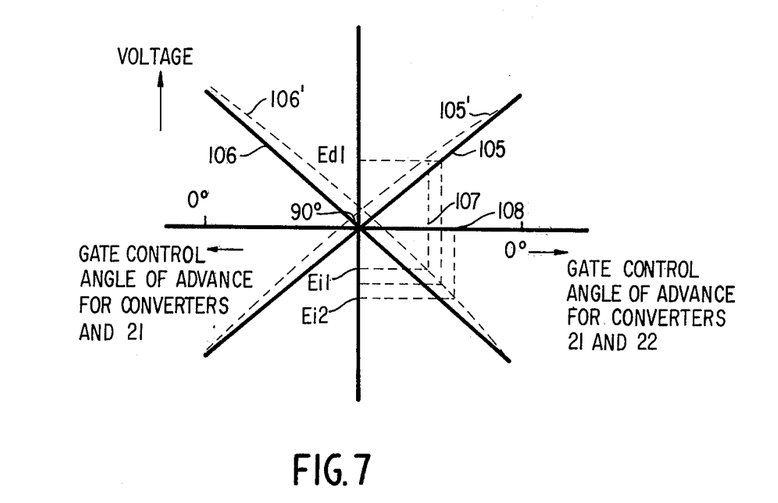
FIG. 7 shows the running modes of thyristor converters disclosed in FIG. 1b.

Referring to FIG. 7, there is shown the characteristics of the converter output voltages to the gate control angle for the converters. The crossing point of the X and Y axes shows the point of an electric angle of 90°. A curve 105 shows the output voltage obtained from converter 21 by adjusting the gate control angle thereof. Similarly, a curve 106 shows the output voltage obtained from the converter 22 by adjusting the gate control angle thereof.

Assume that the converter 21 is operating as a rectifier, and that the converter 22 is still, and further that the gate control angle $\alpha$ of converter 21 is advanced from 90° to 0°, namely from the 90° position to the right. The output voltage of the converter 21 will increase along the curve 105 if the load thereof is greatly inductive. Alternately, if the gate control angle $\gamma$ of lead is advanced from 90° to 0°, namely from the 90° position to the left, converter 21 will function as an inverter and increase the A.C. output voltage thereof along the curve 105.

However, if the load is heavily resistive as described above, the D.C. and A.C. output voltages of converter 21 will vary along the line 105' in accordance with the theory as described above.

It can be easily understood that the same phenomena will take place in the converter 22 so that the D.C. output voltage thereof will vary along the curve 106 from the 90° position to the 0°, namely leftward, in accordance with the advancing of the gate control angle $\alpha$ of lag for converter 22. The A.C. output voltage will also vary along the curve 106 from the 90° position to the 0°, namely rightward, by advancing the gate control angle $\gamma$ of lead, if the load is heavily inductive.

However, if the load is heavily resistive as described above, the D.C. and A.C. output voltages of converter 22 will vary along the curve 106' which deviates from the curve 106. From the above, it will clearly be understood that both converters 21 and 22 operate usually along curves 105' and 106' because of the more resistive component of the armature winding of the motor 10.

Accordingly, if the switching from converter 21 to converter 22 when the converter 21 is effecting the rectifier operation and the converter 22 is still, and if the switching method described above is effected, the A.C. output voltage of converter 22 will be considerably less than the D.C. input voltage thereto to cause an excess rushing current which will flow into the converter 22 when the switch has been made from converter 21 to converter 22.

In other words, as the rightward parts of curves 105' and 106' are employed for the aforesaid switching, if the switching is made from converter 21 to inverter 22 when the D.C. output voltage of converter 21 shows $Ed_1$, the gate control angle $\gamma$ of lead for converter 22 is selected at a point 107 so that the A.C. output voltage of converter 22 will be $Ei_1$ which is considerably less than the D.C. output voltage $Ed_1$ of converter 21.

Accordingly, it can be understood that if the gate control angle for the converter 22 is at a point 108 when the A.C. output voltage $Ei_2$ is substantially equal to $Ed_1$, there will not occur any rushing current flowing into converter 22 when the switching has been made from converter 21 to 22. It can also be understood that the above is an ideal switching condition to which the invention is directed.

Figure 2:
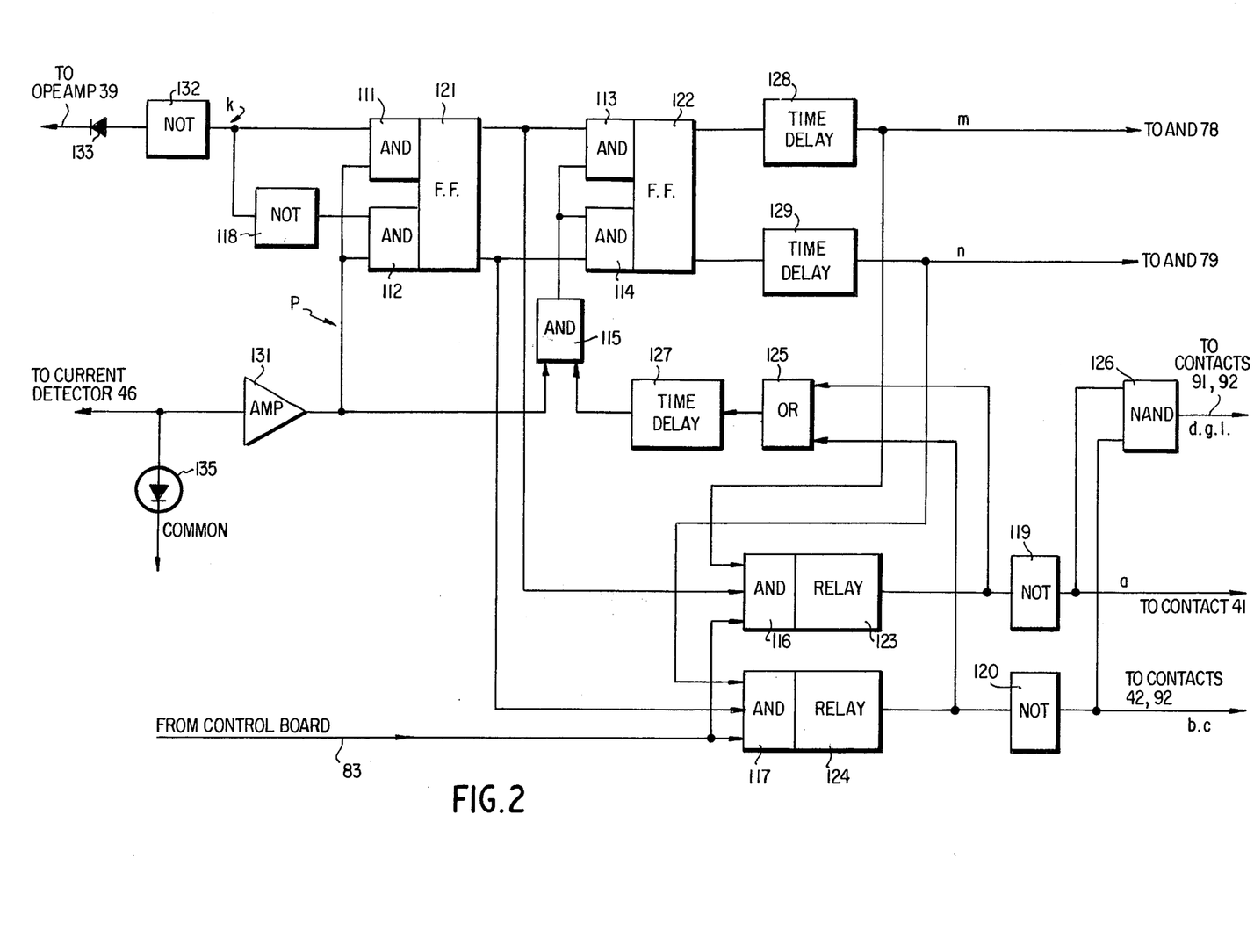
FIG. 2 shows a logic circuit employed in the gate control of FIGS. 1a and 1b.

Reference should now be made to FIGS. 2 and 3 together with FIGS. 1a and 1b.

Figure 3A:
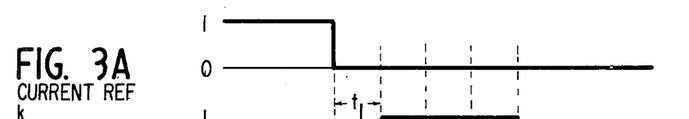

First, assume that the motor 10 is running forward or in a first direction by being energized from converter 21 which is operating as a rectifier. Accordingly, the current reference signal k is 1 as shown in FIG. 3a. At the same time the current zero signal P is 1 because of the existence of electric current flowing from A.C. voltage supply 14 to converter 21. The control order signal is further applied through conductor 83 to the logic 82.

As shown in FIG. 2, the logic 82 comprises AND gates 111 to 117, flip flop circuits 121, 122 (referred to as FF hereinafter), NOT gates 118 to 120 and 132, time delay circuits 127 to 129, an OR gate 125, a NAND gate 126, a high gain amplifier 131, a diode 133 and a Zener diode 135, respectively connected as shown. The left-hand three inputs of the logic 82 respectively receive signals P, k and the control command from the control board (not shown), while the right-hand five outputs thereof generate signals l, m, n, d, g, a, b and c respectively as described above.

For the starting of the system, reference should be made to FIGS. 1a, 1b and 2 together with FIGS. 3a to 3l which show the switching of converters 21 and 22 from one state to another. At the instant of starting, the forward running of the motor 10 is selected and the running command signal comes from the control board (not shown) through conductor 83 to AND gate 117. The current remains zero in the ac main circuit for converters 21 and 22, so that the signal 1 is generated at the output terminal of the high gain amplifier 131.

The forward running of the motor 10 having been selected, a negative signal from operational amplifier 39 to diode 133 is cut off so that NOT gate 132 generates 1 at the output thereof. Accordingly, the two inputs of AND gate 111 receive the signal 1 together while only one input of AND gate 112 receives a 1 because of the existence of NOT gate 118. AND gate 111 then sets FF 121.

The logic element or relay logic 123 and 124 are composed of an IC manufactured and sold as TD-2001P by Tokyo Shibaura Electric Co., Ltd. in Japan, or as MC 661P by Motorola Inc., in USA, and it carries out its logic so that if at least one of the input signals to AND gate 116 or 117 is not present, the relay logic 123 or 124 generates 1. When all of the input signals are present, the relay logic 123 or 124 generates 0.

In the event as described above, AND gate 116 has only two input signals 1 from FF 121 and the control board while AND gate 117 receives only one input signal 1 from control board so that both relay logics 123 and 124 generate 1 together. Either one of output signals from relay logics 123 and 124 is coupled to the time delay 127 through OR gate 125, so that AND gate 115 receives two input signals 1 at the same time from the time delay 127 and the high gain amplifier 131. Consequently AND gate 113 also receives two input signals 1 coming from FF 121 and AND gate 115 to set the FF 122.

When the FF 122 is set, the output signal 1 is applied to time delay 128 to generate signal m. In this way, if the signal m will generate or become 1, AND gate 116 receives the input signals 1 to generate 0 from relay logic 123. Thus NOT gate 119 generates a signal 1 which is in turn conducted to close contact 41.

As soon as the signal m is 1, AND gate 78 of FIG. 1b opens to allow the gate controlling pulses coming from pulse generator 26 to be applied to the gate electrodes of thyristors mounted in the converter 21. As the output signal of relay logic 123 becomes 0, the NOT gate 119 generates the signal a of 1. On the other hand, relay logic 134 continues its output 1 so that output signals b and c of NOT gate 120 cannot be 1. The signal a of 1 is conducted to close the contact 41 of FIG. 1a. In this way, the gate control circuit 25 of FIGS. 1a and 1b will be established to control the converter 21 which is now operated as a rectifier.

During the beginning of the start, as the motor speed which is fed back from tachometer generator 35 to summing point 35 is very small, the speed setting signal generated from potentiometer 33 functions to greatly advance the gate control angle of converter 21 and to thereby increase the D.C. output voltage of the converter 21 for acceleration of the motor 10. However, the current feedback signal from current detector 46 to summing point 43 through conductor or minor loop 70 and the voltage feedback signal from the D.C. circuit of converters 21 and 22 to summing point 60 will respectively function to moderate the phase control of converter 21.

In this way, electric motor 10 is accelerated forward along the curve 100 of FIG. 5. The input signals k and p and the output signals a, b, c, m, n, d, g and l of the logic 82 of FIG. 2 are shown in FIGS. 3a and 3i. The logical states of those signals before the switching from one converter 21 to another can be clearly understood from the above description by referring more to the left-hand parts of FIGS. 3a to 3h then a time at which the current reference k, namely the output signal of operational amplifier 39, changes from 1 to 0.

Assume that the forward running of motor 10 is altered by the switch 34 from the present position to the right. Of course, the switch 34 can be formed of the static type and its switching operation can be controlled by a command coming from a control board, a sequence or an industrial mini-computer which controls the positioning signal of the material body rolled in the rolling mill. Further potentiometer 33 may be driven by an electric stepping motor or an electric servo-motor for finely setting the speed.

As the switch 34 has been thrown rightward in FIG. 1a, the speed setting signal polarity becomes negative and is added to the speed feed back signal. The output signal from operational amplifier 39, which acts as the current reference for the second operational amplifier 40, changes its polarity from the negative to the positive and has a relatively large absolute amplitude. Consequently, the D.C. control voltage $e_c$ which is the output from power amplifier 68 will be relatively high so that the gate control angle of $\alpha$ for the converter or rectifier 32 will be squeezed rapidly to an electric angle of lag of 90° so as to obtain a minimum output voltage from the rectifier.

When the switching command has been generated as mentioned above, the current reference k of FIG. 2 changes from 1 to 0 as shown in FIG. 3a. At the same time, the D.C. output current of converter 21 begins to decrease as shown in FIG. 3i and reaches zero as shown in FIG. 3a in which the expended time interval is shown as $t_1$.

Figures 3B, 3C:
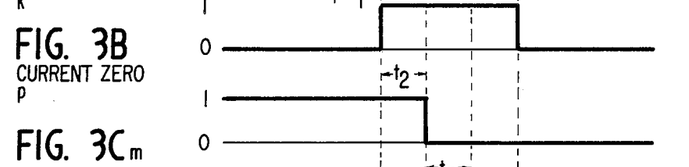
Figure 3D:
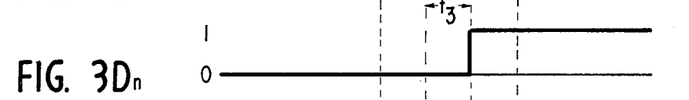
Figure 3E:
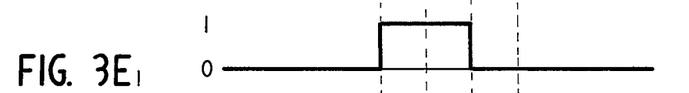

As soon as the current has reached zero, the current zero signal P changes from 0 to 1 as shown in FIG. 3b. This is achieved by the Zener diode 135 and the high gain amplifier 131 as follows. During the time the current level exceeds the Zener voltage of diode 135, the voltage is substantially expended through the Zener diode 135. If the current level comes down to be zero, the Zener diode 135 does not perform its function. Accordingly, the output of high gain amplifier 131 will increase to saturation so that the current zero signal p changes from 0 to 1.

In this way, two inputs of AND gate 112 are 1 together to reset FF 121 so that one of the input signals from FF 121 to AND gate 116 changes from 1 to 0 to generate 1 from relay logic 123. The 1 of relay logic 123 is applied to AND gate 115 through OR gate 125 and the time delay 127 so that two inputs of AND gate 115 are 1 together after the delay of time delay 127. Thus, AND gate 114 receives two signals of 1 to reset FF 122 so that the signal $m$ changes from 1 to 0 as shown in FIG. 3c sometime $t_2$ after the delay of the time delay 127. The reset signal of FF 122 is coupled to the time delay 129 to generate the signal $n$ of 1 sometime $t_3$ after the delay of the time delay 129 in FIG. 3d.

Figure 3F:
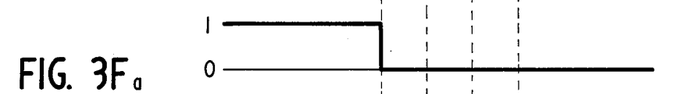
Figure 3G:
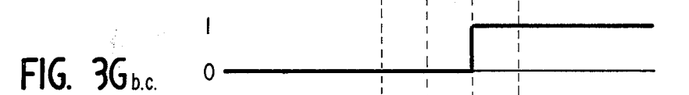

With respect to other parts of the logic 82, as soon as the current zero has occurred to reset FF 121, the output signal of relay logic 123 changes from 0 to 1 to change the output signal $a$ of NOT gate 119 from 1 to 0 as shown in FIG. 3f.

Figure 3H:
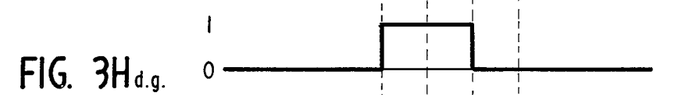
Figure 3I:
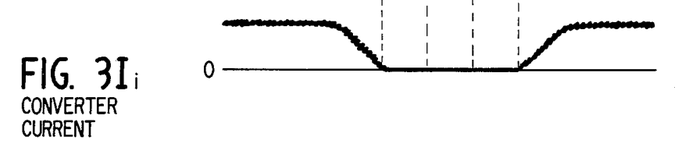
Figure 4:
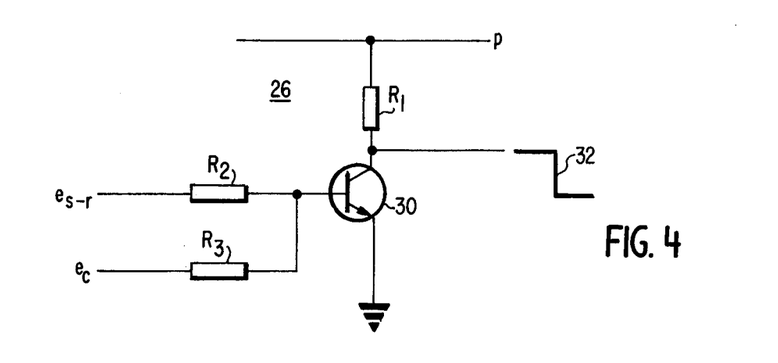
FIG. 4 shows a circuit diagram of a part of the gating pulse generator disclosed in FIG. 1b.

The NAND gate has two inputs connected to the outputs of NOT gates 119 and 120. The signals $a$, $b$ and $c$ are 0 now so that NOT gates 119 and 120 generate signals $d$, $g$ and $l$ of 1 as shown in FIGS. 3e and 3h at the beginning of zero current. The 1 of signal 1 can override the D.C. control signal $e_c$ from the pre-stage operational amplifiers 40, 55 and 61 to fix the gate control angle $\alpha$ of lag for the converters 21 to 90°.

In addition, the contacts 91 and 92 are closed by the 1 of signals $d$ and $g$ so that the motor armature voltage is fed back to the summing point 97 through the sub-minor loop 93. Since the contact 41 has been opened, the operational amplifier 40 does not operate as a current type but, instead operates as a voltage type. As described above, the operational amplifier 40 is of the integrating type with a capacitor 50 connected in parallel. The output signal voltage is amplified through amplifiers 55 and 62 and is returned to the summing point 97 through contact 92.

This means that the output voltage from operational amplifier 40 varies following the motor armature voltage so long as the contacts 41 and 42 are opened and the contacts 91 and 92 are closed alternately.

It will be understood that the operation of the amplifier 40 shows a lost motion because the logic signals $b$, $c$ have not yet been generated. However, it is important to prepare the gate control angle for the converter 22 which will be an inverter shortly in accordance with the present motor armature voltage. This will reduce the rushing current flowing into the converter 22 from the converter 21 as discussed by referring to FIG. 7.

As described above, since the signal $m$ changes from 1 to 0 under the control of time delay 115, the reset signal $n$ of FF 122 will change from 0 to 1 after some time $t_3$ governed by the time delay 129. The 1 of signal $n$ opens AND gate 79 and enables the gate control signals coming from pulse generator 25 to be applied to the alternate converter 22 through power amplifier 81. However, the gate control angle $\gamma$ of lead is fixed to 0° which corresponds to the angle $\alpha$ of lag of 90° when the converter functions as a rectifier. The converter 22 must function as an inverter for a period to enable the motor speed to be reduced by the regenerative brake.

As soon as the 1 of the signal n has occurred, the relay logic 124 changes its output state from 1 to 0 so that the output signals $b$ and $c$ of NOT gate 120 changes from 0 to 1. The NAND gate 126 changes its outputs $d$, $g$ and $l$ from 1 to 0 at the same time. Accordingly, contacts 42 and 76 close and at the same time the override signal 1 for power amplifier 68 is eliminated and contacts 91 and 92 are opened. However, the current zero exists for a while as shown in FIG. 3b. This logic sequence is shown in FIGS. 3a to 3i.

The operational amplifier 40 is returned again to a current operation and compares the alternate negative feedback current from current detector 46 with the alternate positive current reference from operational amplifier 39 at the summing point 44. Operational amplifier 40 generates a current deviational signal which in turn functions as a voltage reference for the operational amplifier 55.

The operational amplifier 55 compares the voltage feedback signal from the motor armature 11 with the voltage reference from the pre-stage amplifier 40 and generates a voltage deviation signal.

The voltage deviation signal is passed through two paths, one of which includes resistor 85 and the other of which includes a high gain amplifier circuit consisting of an operational amplifier 62, a contact 76 and a resistor 86 which has a resistance of one half that of resistor 85. In this way, the output signals from resistors 85 and 86 are combined at the summing point 75. Thus, the input level for the operational amplfier 61 is equal to that of only the operational amplifier 55. The polarity of the input signal for the amplifier 61 can be the reverse of that of the operational amplifier 55.

In this way, all of the elements in FIGS. 1a and 1b are prepared for the reverse running of the motor 10. The input and output polarities of the operational amplifiers 39, 40, 55 and 61 are reversed to those shown in FIGS. 1a and 1b for the reverse running of the motor 10.

It can be easily understood that the motor 10 reduces its rotational speed gradually and mainly under the mechanical load of the rolling mill after the reverse rotational signal is generated from the potentiometer 33 by the movement of switch 34 rightward.

After the state changing of the logic signals $n$, $l$, $b$, $c$, $d$ and $g$, namely during the switching operation of the gate control circuit 25, the gate control angle $\gamma$ of lead will remain at the current value of the motor armature voltage by the integrating function of operational amplifier 40.

After the instant of completion of the aforesaid switching operation of the gate control circuit 25, converter 22 begins its inverter operation so that the current begins to flow and increase gradually in the A.C. main circuit as shown in the right-hand of FIG. 3i. Consequently, the motor speed is reduced effectively by the regenerative brake circuit flowing from the motor 10 to the AC voltage supply 14 of FIG. 1b through the converter 22 which now functions as an inverter. The regenerative brake current and voltage are smoothly adjusted by the operational amplifiers 40 and 55.

After that, the motor 10 comes to a halt and the converter functions as a rectifier which generates a D.C. variable voltage for energizing and driving the motor 10 in the second direction or reversely under the speed command signal from the potentiometer. This has not been described in detail because it is conventional to those skilled in the art.

The switching from reverse running to forward running is made as described above except that FF 121 and FF 122 are set by the 1 of the current reference signal K.

Figure 8:
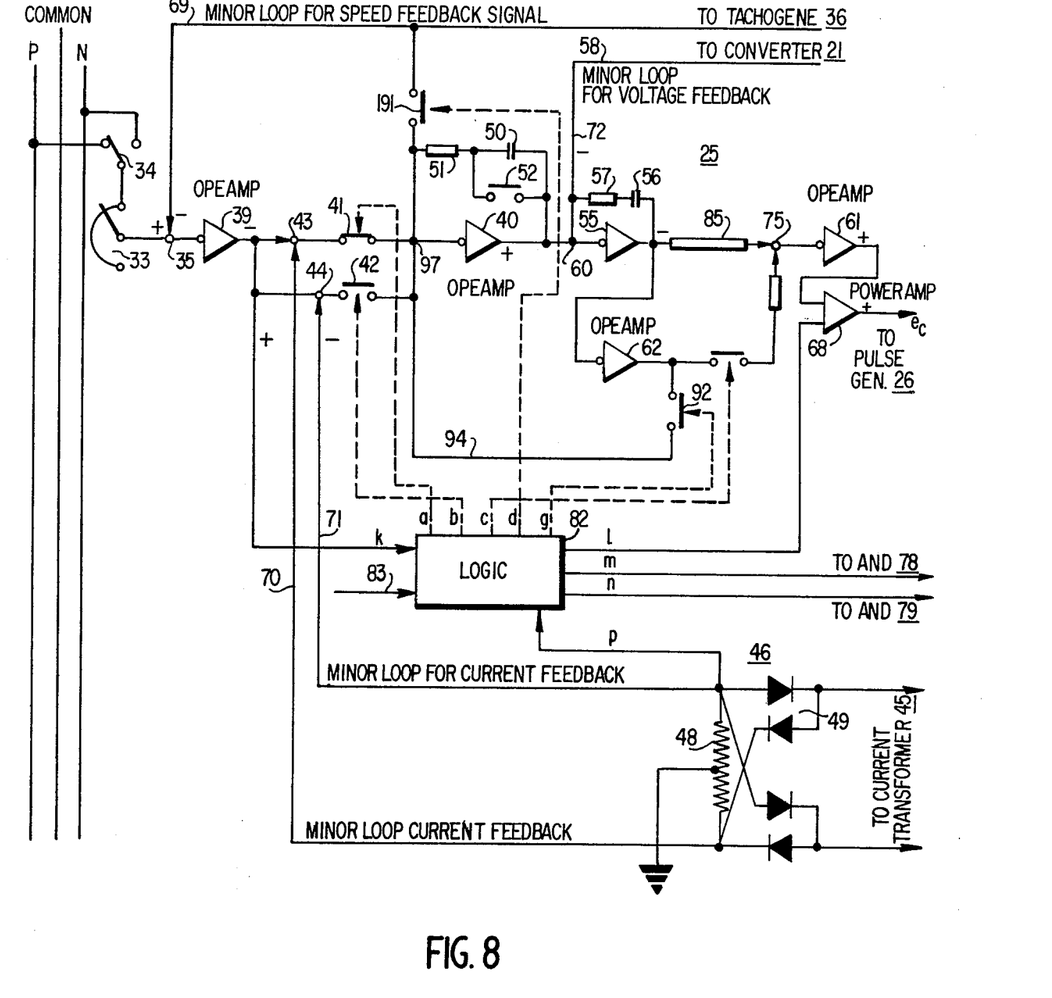
FIG. 8 is a partial circuit diagram of another embodiment of the invention.

In accordance with the modification of FIG. 8, the rotational speed signal is conducted from the tachometer generator 36 of FIG. 1b to the summing point 97 of the operational point 97 of the operational amplifier 40 through minor loop 69 and contact 191 which is closed by the 1 of the logic signal d. The voltage generated by the tachometer generator 36 changes in proportion to the motor armature voltage as disclosed in FIGS. 1a and 1b.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the U.S. is:

1. A gate control for reversibly driving a D.C. electric motor comprising:
    a first thyristor converter for operating as a rectifier for energizing the motor to drive it forward;
    a second thyristor converter for remaining still during the time the motor runs in the forward direction;
    means for energizing the motor from the first thyristor converter and then from the second thyristor converter;
    means for connecting an A.C. voltage supply to the converters;
    means for generating gating pulses synchronized with the frequencies of the A.C. voltage supply for the converters;
    first and second gating circuits for selectively applying the gating pulses from the gating pulse generating means to gate electrodes of the converters;
    means for comparing a voltage signal corresponding to the rotational speed signal of the motor with a speed reference voltage signal and for feeding a speed deviation voltage signal to the pulse generating means to phase shift the gating pulses to enable adjustment of the output voltage from the converter operating as a rectifier to adjust the motor speed to coincide substantially with the reference speed indicated by the speed reference voltage signal;
    operational amplifier means having an integrating function for effecting current control of the converters in response to the deviation current signal by comparing the converter current with the deviation derived from the speed deviation feeding means to render the converter current substantially equal to the amplitude of the speed deviation; and
    means for disconnecting the operational amplifier means from the speed deviation feeding means and for alternately applying an electrical voltage signal responsive to the motor speed and a modified feedback signal from the output terminal of the operational amplifier to an input terminal of the operational amplifier during the time the converters are switched from one state to another to prepare for reverse rotation of the motor so that the phase adjustment of the gating pulses emanating from the gate control follows the electrical signal voltage responsive to the motor speed during the time the thyristor converters are switched from one state to another.

2. A gate control according to claim 1 wherein the gating circuits for applying the gating pulses to the gate electrodes of the converters comprise a first AND gate for introducing the gating pulses to one of the converters and a second AND gate for introducing the gating pulses to the other of the converters without the first and second AND gates being simultaneously on.

3. A gate control according to claim 1 wherein:
    the operational amplifier means comprises an operational amplifier for controlling the current flowing between the converters;
    the electric motor has an input terminal and a static switch connected in series therewith for feeding the armature voltage of the motor back to the input terminal of the operational amplifier, and
    the static switch is closed only during the preparatory period of switching the converters from one state to another when a reversible running command is coupled to the motor.

4. A gate control according to claim 1 wherein the operational amplifier disconnect means comprises logic means which responds to the switching command signal for switching the converters from one state to another for responding to the zero current signal from the main circuit of the converters and which responds to the running command signal from a master control means so that the logic circuit means enables the gate control to prepare for switching the converters from one state to another and enables the converter about to change from one state to another to prepare for the momentary inverter operation.

5. A gate control means according to claim 4 wherein:
    the logic means comprises first, second and third operational amplifiers connected in tandem and a fourth operational amplifier,
    the first operation amplifier being for the speed control of the motor, the second operational amplifier being for the current control of the converters and the third operational amplifier being for the voltage control of the converters,
    the logic means further comprises a power amplifier to amplify the resultant output signal obtained from the first, second and third operational amplifiers,
    the output terminal of the third operational amplifier being connected to the input terminal of the power amplifier through a first resistor,
    the fourth operational amplifier being connected between the output terminal of the third operational amplifier and a summing point located at the input terminal of the power amplifier through a normally open static switch and a second resistor connected in series therewith,
    a first circuit comprising the third and fourth operational amplifiers, the static switch and the second resistor having a gain which is substantially twice that of a second circuit which comprises the third operational amplifier and the first resistor so that the first circuit switches the converters from one state to another by closing the static contact for reverse motor running.

6. A gate control according to claim 5 wherein the logic means comprises an output terminal for generating a signal to override the gate control signal generated by the pre-stage operational amplifiers, and
    the override signal is applied to the power amplifier when preparation is made for the switching of the converters from one state to another in preparation for the reverse running the of motor.

7. A gate control according to claim 4 wherein the logic means further comprises output terminals which generate signals for switching the AND gates connected to corresponding converters, and
the signals are fed alternately and selectively to the AND gates in response to the switching of the converters from one state to another.

* * * * *